2 Sheets—Sheet 1.

J. S. ADAMS.
Mechanism for Transmitting Power of Windmills.

No. 199,008. Patented Jan. 8, 1878.

2 Sheets—Sheet 2.

J. S. ADAMS.
Mechanism for Transmitting Power of Windmills.

No. 199,008. Patented Jan. 8, 1878.

WITNESSES:
Jas. E. Hutchinson.
Henry C. Hazard.

INVENTOR-
Jno. S. Adams, by
Prindle and Co., his
Attorneys

UNITED STATES PATENT OFFICE.

JOHN S. ADAMS, OF ELGIN, ILLINOIS.

IMPROVEMENT IN MECHANISMS FOR TRANSMITTING POWER OF WINDMILLS.

Specification forming part of Letters Patent No. 199,008, dated January 8, 1878; application filed August 10, 1877.

*To all whom it may concern:*

Be it known that I, JOHN S. ADAMS, of Elgin, in the county of Kane and in the State of Illinois, have invented certain new and useful Improvements in Windmills and Mechanism for Transmitting the Power of the same; and do hereby declare that the following is a full, clear, and exact description thereof, reference being had to the accompanying drawings, making a part of this specification, in which—

Figure 1:
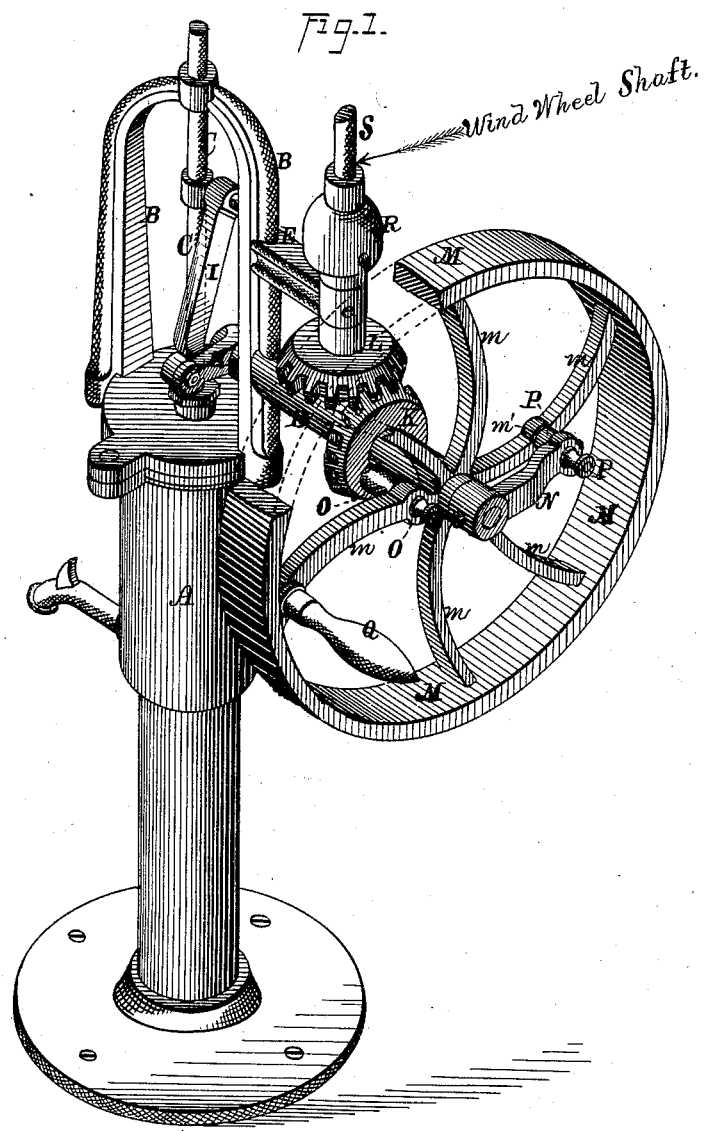
Figure 2:
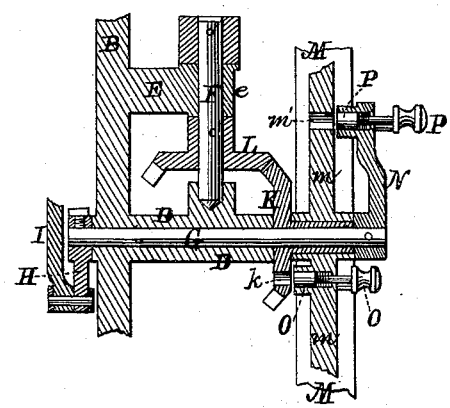
Figure 3:
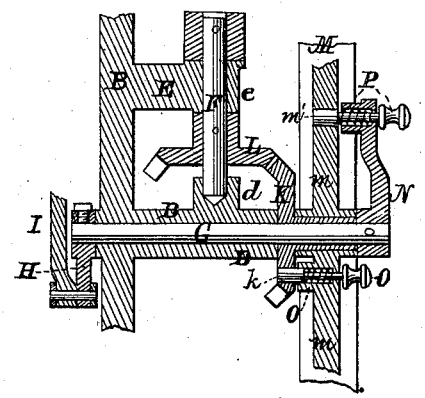
Figure 4:
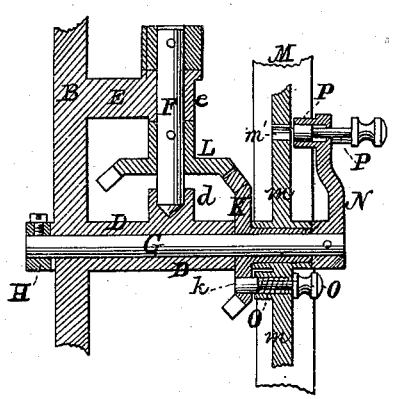
Figure 5:
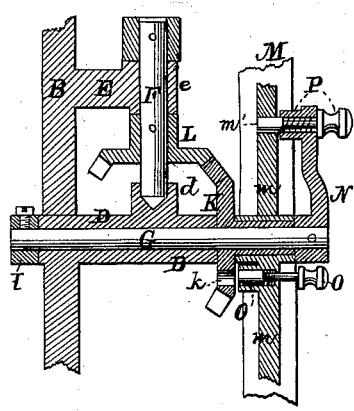

Figure 1 is a perspective view of my improved operating mechanism applied to a vertical reciprocating pump. Fig. 2 is a vertical central section of said mechanism, the windmill being disconnected from both pump and band-wheel. Fig. 3 is a like view of the same, both band-wheel and pump being connected with the windmill. Fig. 4 is a vertical central section of said parts, showing the windmill in connection with said band-wheel while disconnected from said pump; and Fig. 5 is a like view of the same, the windmill being in engagement with the pump and disconnected from the band-wheel.

Letters of like name and kind refer to like parts in each of the figures.

In the employment of windmills upon farms the principal object sought is the raising of water; but, in some instances, the power is applied during a portion of the time to other purposes through the intervention of gearing or belting. As it frequently occurs that the power is required for but one of these purposes, it is therefore desirable that means should be provided whereby either or both forms of machinery can be driven, as required, or that the same may be operated by hand, without moving the windmill, whenever the wind fails.

Experience has shown that the most economical means for transmitting the power of a windmill is by gearing and shafts, as thereby the waste of power and wear of parts attendant upon the use of a crank and a vertically-reciprocating connecting-rod are avoided. To enable this form of mechanism to be applied to the purposes hereinbefore named is the design of my invention, which consists, principally, in the means employed for transmitting the motion of the vertical shaft of a geared windmill to the reciprocating plunger of a pump, and for disconnecting said parts at will, substantially as and for the purpose hereinafter specified.

It consists, further, in the means employed for transmitting the motion of the vertical shaft of a geared windmill to a band-wheel which rotates in a vertical plane, and for disconnecting said parts when desired, substantially as and for the purpose hereinafter set forth.

It consists, finally, in the mechanism as a whole, its several parts being constructed and combined to operate in the manner and for the purpose substantially as is hereinafter shown and described.

In the annexed drawings, A represents the barrel of an ordinary piston-pump, from the upper end of which rises a yoke, B, through which passes the upper end of the piston or plunger rod C.

Extending laterally outward from one side of the yoke B, at a point below its vertical center, is a hollow boss or sleeve, D, while from a point above said vertical center a lug, E, extends outward in a line with said boss D, and at its end is provided with a bearing, e, that receives one end of a vertical shaft, F, the opposite lower end of which shaft is contained within a bearing, d, that is formed upon the upper side of said sleeve.

Within the boss D is journaled a shaft, G, which, at its inner end, is provided with a crank, H, that is connected by means of a bar, I, with the piston-rod C, so that the rotation of said shaft will cause said rod and the piston or plunger of the pump to reciprocate.

Fitted loosely upon the shaft G, at the outer end of the boss D, is a bevel-gear, K, which meshes with a similar gear, L, that is secured to or upon the shaft F, while upon said shaft G, outside of said gear K, is loosely fitted a band-wheel, M, and upon the end of said shaft is rigidly secured a crank-arm, N.

Within one of the arms m of the band-wheel M is provided a spring-detent, O, which moves longitudinally in a line with the shaft G, and at its inner end is capable of engagement with a correspondingly-shaped recess, k, that is formed within the outer face of the gear K.

A second detent, P, similar in construction and operation to the detent O, is placed within the outer end of the crank-arm N, and at its inner end is capable of engagement with a recess, $m'$, that is formed within one of the arms $m$ of the band-wheel M.

A crank-handle, Q, secured within and projecting horizontally outward from one of the arms $m$ of the band-wheel M, and a clutch or other connection, R, between the lower end of the vertical shaft S of the windmill and the upper end of the shaft F, complete the device, the operation of which is as follows:

When it is desired to operate the pump by the windmill, the detent P is thrown into engagement with the band-wheel, so as to connect the latter with the shaft G, and the detent O is caused to engage with the gear K, as shown in Fig. 3, by which means the motion of the shaft S will be communicated, through the parts named, to said pump.

When it is desired to stop the pump without interference with the motion of the band-wheel, the detent P is withdrawn from engagement with said wheel, after which the latter and the gear K will revolve upon the shaft G without causing the same to rotate.

When the windmill is not in motion the pump may be operated by hand by throwing the detent O out of and the detent P into engagement, after which, by means of the handle Q, the band-wheel M and shaft G may be rotated and said pump caused to move.

Should it be desired to operate the band-wheel alone by hand, both detents are withdrawn, when said wheel will revolve loosely upon the shaft G, beside the gear-wheel K.

In order to secure a broader bearing for the gear-wheel K, its hub is extended outward, and forms a bearing for, and upon which revolves, the wheel M. This construction is, preferably, employed, although not essential to the operation of the mechanism.

The mechanism thus constructed furnishes a simple, convenient, and efficient means whereby the whole or a portion of the power of a windmill may be applied to the operation of a pump or other machinery, and by which both may be operated at one time, or either run without moving the other.

Having thus fully set forth the nature and merits of my invention, what I claim as new is—

1. As a means for transmitting the power of a geared windmill to a pump, the shafts F and G, the crank H, the bar I, pivoted upon said crank and the piston-rod C, the gears K and L, the crank-arm N, and the detent P, arranged to connect said crank-arm and the gear K, said parts being combined to operate in the manner and for the purpose substantially as specified.

2. As a means for transmitting the power of a geared windmill to mechanism which is operated by a belt, the shafts F and G, the gears K and L, the band-wheel M, and the detent O, said parts being constructed and combined in the manner and for the purpose shown.

3. The hereinbefore-described mechanism, in which the piston-rod C, shafts F and G, crank H, connecting-bar I, gears K and L, band-wheel M, crank-arm N, and detents O and P are constructed as shown, and combined with each other, a geared windmill, and a pump, substantially as and for the purpose set forth.

In testimony that I claim the foregoing I have hereunto set my hand this 31st day of July, 1877.

JOHN S. ADAMS.

Witnesses:
CHAS. S. KILBOURNE,
M. C. TERRN.